United States Patent
Jonak et al.

(10) Patent No.: US 10,814,760 B1
(45) Date of Patent: Oct. 27, 2020

(54) RIDING LAWN EQUIPMENT SEAT

(71) Applicant: DEERE & COMPANY, Moline, IL (US)

(72) Inventors: Mark C. Jonak, Cary, NC (US); David W. Geiger, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/386,397

(22) Filed: Apr. 17, 2019

(51) Int. Cl.
*B60N 2/72* (2006.01)
*B60N 2/68* (2006.01)
*B60N 2/38* (2006.01)

(52) U.S. Cl.
CPC ............... *B60N 2/72* (2013.01); *B60N 2/38* (2013.01); *B60N 2/686* (2013.01)

(58) Field of Classification Search
CPC ............ B60N 2/72; B60N 2/38; B60N 2/686
USPC ............. 297/440.2, 440.22, 452.55, 452.56, 297/452.61
See application file for complete search history.

(56) References Cited

U.S. PATENT DOCUMENTS

| | | | | |
|---|---|---|---|---|
| 3,861,747 A | * | 1/1975 | Diamond | B60N 2/68 297/452.49 |
| 4,332,419 A | * | 6/1982 | Vogel | A47C 7/185 297/440.22 |
| 4,542,887 A | | 9/1985 | Bethell et al. | |
| 4,647,109 A | | 3/1987 | Christophersen et al. | |
| 4,673,542 A | | 6/1987 | Wigner et al. | |
| 4,860,415 A | | 8/1989 | Witzke | |
| 5,067,772 A | * | 11/1991 | Koa | A47C 7/185 297/452.55 X |
| 9,676,311 B2 | | 6/2017 | Murolo et al. | |
| 9,738,193 B2 | | 8/2017 | Ito | |
| 10,195,966 B2 | | 2/2019 | Ueguri et al. | |
| 2016/0272095 A1 | | 9/2016 | Mill | |

FOREIGN PATENT DOCUMENTS

| | | |
|---|---|---|
| EP | 0677421 A2 | 10/1995 |
| EP | 1008317 A1 | 6/2000 |

OTHER PUBLICATIONS

European Search Report issued in counterpart application No. 20169458.5 dated Aug. 19, 2020 (06 pages).

* cited by examiner

*Primary Examiner* — Anthony D Barfield

(57) ABSTRACT

A riding lawn equipment seat having an outer plastic shell, a foam base cushion and a foam back cushion. A plastic webbing is embedded inside each of the cushions. A plurality of clips extends from each plastic webbing and through each cushion into engagement with a plurality of slots in the shell.

9 Claims, 2 Drawing Sheets

RIDING LAWN EQUIPMENT SEAT

FIELD OF THE INVENTION

This invention relates to seats for riding lawn equipment, lawn tractors and other utility or lawn care vehicles.

BACKGROUND OF THE INVENTION

In the past, riding lawn equipment seats typically have one or more cushions glued to an outer plastic shell. A layer of adhesive is applied all the way around the perimeter of the shell. The cushions also may have a vinyl outer surface bonded to foam. The cushions are laid onto the shell, and are held together under pressure for a specified time period (e.g., 5 mins) until the adhesive has cured properly and formed a strong bond. However, the adhesive tends to fail over time under weathering conditions, and is one of the leading failure modes of riding lawn equipment seats. A riding lawn equipment seat is needed that is lower in cost and does not have the adhesive problem described above.

SUMMARY OF THE INVENTION

A riding lawn equipment seat includes plastic frames embedded in foam base and back seat cushions. Each plastic frame has a plurality of attachment devices that engage a plurality of slots in a plastic shell. The attachment devices extend through and outwardly from the foam cushion. The attachment devices attach the seat cushions to the plastic shell without glue or any other adhesive, and the seat is lower in cost than conventional riding lawn equipment seats.

DESCRIPTION OF THE PREFERRED EMBODIMENT

Figure 1:
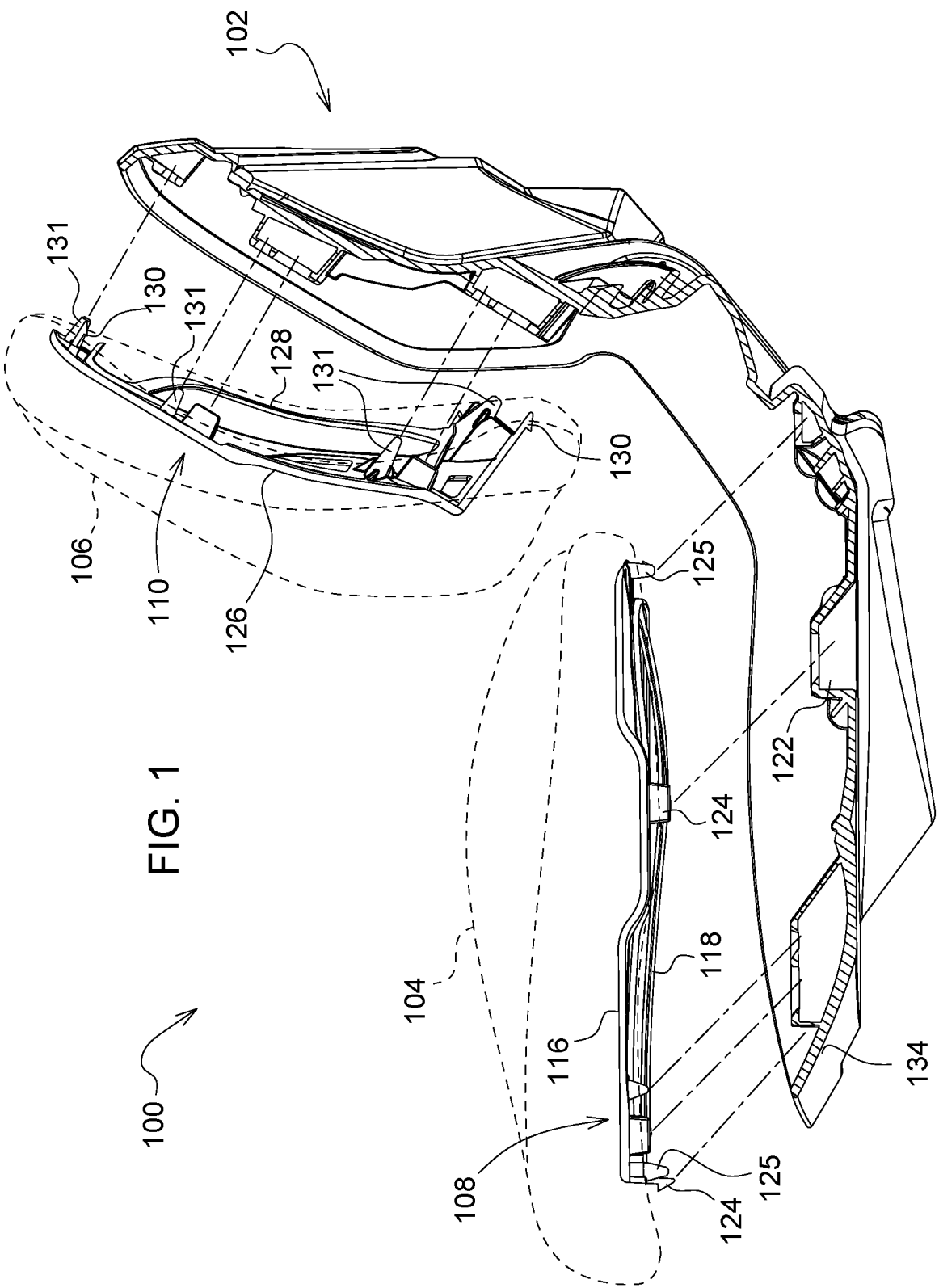
FIG. 1 is an exploded top perspective view of a riding lawn equipment seat according to a first embodiment of the invention.
Figure 2:
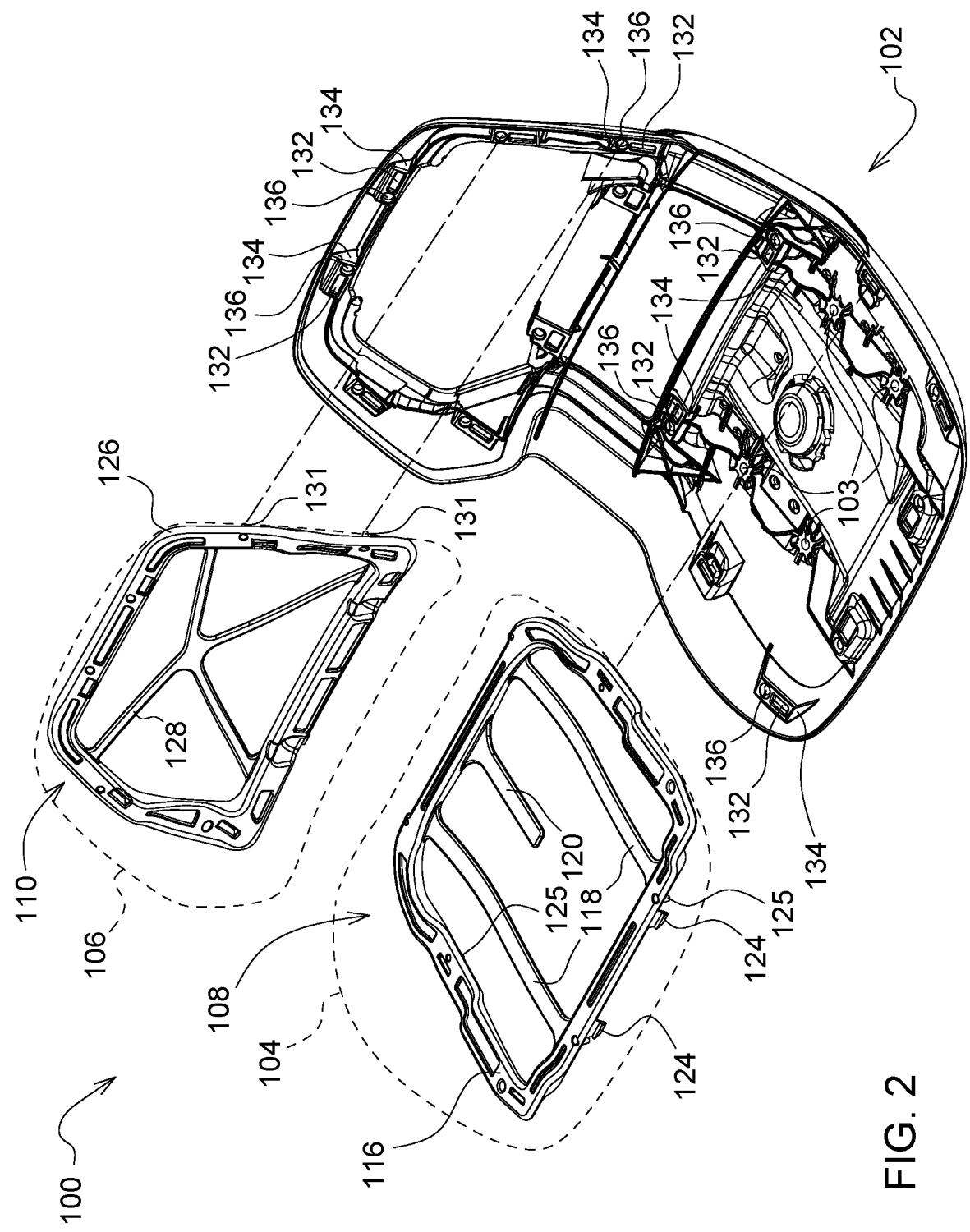
FIG. 2 is an exploded left side view of a riding lawn equipment seat according to a first embodiment of the invention.

In one embodiment of the invention shown in FIGS. 1-2, riding lawn equipment seat 100 may include outer plastic shell 102, base seat cushion 104 with embedded plastic frame or webbing 108, and back seat cushion 106 with embedded plastic frame or webbing 110. The base seat cushion and back seat cushion are attached to the shell without glue or any other adhesive. Preferably, the shell may be a one-piece structure that is injection molded using 15% glass filled polypropylene. Alternatively, the shell may be a two piece structure having a back portion and a base portion. The base seat cushion and back seat cushion each may be foam such as open cell polyurethane, and each seat cushion optionally may have an outer vinyl layer covering the foam. Alternatively, the back seat cushion and base seat cushion may be combined together to form a single cushion. The plastic frame or webbing embedded in the foam may be flexible plastic such as 15% glass filled polypropylene, and will be described in more detail below.

In one embodiment, shell 102 may include a plurality of attachment features 103 on the underside for securing the shell to a seat pan of riding lawn equipment, operator detection switch 122 attached to the underside of the shell, and a plurality of slots 132 and cylindrical or conical recesses 136 for attachment and alignment of the base and back seat cushions. For example, the slots and recesses may be located in dugouts 134 on the inside of the shell structure which cannot be seen from the back of the shell.

In one embodiment, plastic frame or webbing 108 may be embedded inside base seat cushion 104. Plastic frame or webbing 108 may be a one piece structure having outer perimeter 116, one or more cross members 118 extending between opposite sides of the perimeter, operator detection member 120 extending inwardly from the perimeter to a central location over operator detection switch 122 in shell 102, and a plurality of hook shaped clips 124 and a plurality of conical or cylindrical guide pins 125 projecting downwardly from the perimeter. Clips 124 and guide pins 125 may extend through the foam and/or vinyl layer, and out from the bottom surface of the base seat cushion where they may enter and/or engage the slots and recesses in the shell. Because clips 124 are used to attach the base seat cushion to the shell, no glue or adhesive is used or needed.

Similarly, in one embodiment, plastic frame or webbing 110 may be embedded inside back seat cushion 106. Plastic frame or webbing 110 may be a one piece structure with outer perimeter 126, one or more cross members 128 extending between opposite sides of the perimeter, and a plurality of hook shaped clips 130 and conical or cylindrical guide pins 131. The clips and guide pins may extend rearwardly and/or downwardly from the perimeter of plastic frame or webbing 110, through the foam and/or vinyl layer, and out from the back surface of the back seat cushion to enter and/or engage the slots and recesses in the shell. Clips 130 attach the back seat cushion to the shell, so no glue or adhesive is used or required.

In one embodiment, riding lawn equipment seat 100 may be produced using an injection molding process. Each plastic frame or webbing 108, 110 may be inserted into an injection mold, while the clips and guide pins may extend out from the mold. Foam may be introduced into the injection mold. A sheet of vinyl may be heated and placed into the mold before the foam is sprayed into the mold. The hot sheet of vinyl may be vacuum formed in the mold, and the foam may be sprayed in a liquid state into the mold between the vinyl. The mold is then closed for about 5 minutes while the liquid foam expands and changes state into a solid open cell foam, filling the mold and bonding to the vacuum formed vinyl. Each cushion may be removed from the mold. Guide pins which extend through and outwardly from each cushion may be inserted into cylindrical or conical recesses 136 in the shell to correctly align and position the cushion with the shell. The cushion then may be attached to shell with the clips extending through and out from the surface of the cushion, by pressing the clips into slots 132 in the shell and snapping the clips into engagement with the slots.

In one embodiment, riding lawn equipment seat 100 may include other attachment devices, instead of clips and/or guide pins, to attach each foam cushion to the shell without glue or any other adhesive. For example, the attachment devices may be threaded fasteners such as bolts or screws that may be inserted through the shell into engagement with an attachment device in the embedded plastic frame or webbing. Alternatively, the attachment devices may be molded in features such as wedges or hinges on the embedded plastic frame or webbing, which then may be connected to the shell.

Having described the preferred embodiments, it will become apparent that various modifications can be made without departing from the scope of the invention as defined in the accompanying claims.

The invention claimed is:

1. A riding lawn equipment seat, comprising:
an outer plastic shell, a foam base cushion and a foam back cushion;
a plastic webbing embedded inside each of the foam base and back cushions;
a plurality of clips extending from each plastic webbing and through each cushion into engagement with a plurality of slots in the shell; and
a plurality of guide pins extending from each plastic webbing and through each cushion into a plurality of recesses in the shell.

2. A riding lawn equipment seat, comprising:
an outer plastic shell, a foam base cushion and a foam back cushion;
a plastic webbing embedded inside each of the foam base and back cushions;
a plurality of clips extending from each plastic webbing and through each cushion into engagement with a plurality of slots in the shell; and
an operator detection member extending from a perimeter of the plastic webbing to a central location in the foam base cushion.

3. The riding lawn equipment seat of claim 1 wherein the plurality of slots are located in dugouts in the outer plastic shell that are not visible from outside the shell.

4. A riding lawn equipment seat, comprising:
a plastic shell having a plurality of slots;
a plastic frame having a plurality of attachment devices that engage the plurality of slots in the shell;
a foam cushion in which the plastic frame is embedded; the plurality of attachment devices extending through and outwardly from the foam cushion; and
an operator detection switch in the shell, and an operator detection member extending inwardly from a perimeter of the plastic frame to a location over the operator detection switch.

5. The riding lawn equipment seat of claim 4 further comprising a plurality of guide pins extending through and outwardly from the foam cushion.

6. The riding lawn equipment seat of claim 4 wherein the plurality of attachment members are hook shaped clips.

7. A riding lawn equipment seat, comprising:
a plastic webbing embedded inside a seat cushion;
a plurality of attachment devices extending from the plastic webbing and through the seat cushion and engageable with an outer plastic shell to provide the only attachment between the seat cushion and the shell; and
a plurality of guide pins extending from the plastic webbing and through the seat cushion and entering the plastic shell to align the seat cushion and the shell.

8. The riding lawn equipment seat of claim 7 wherein the plurality of attachment devices are hook shaped clips that are engageable with a plurality of slots in the outer plastic shell.

9. The riding lawn equipment seat of claim 7 wherein the plurality of attachment devices are in dugouts inside the shell which are not visible from outside the shell.

* * * * *